(12) United States Patent
Chen et al.

(10) Patent No.: US 8,284,721 B2
(45) Date of Patent: Oct. 9, 2012

(54) METHODS AND APPARATUS FOR ANTENNA ISOLATION-DEPENDENT COEXISTENCE IN WIRELESS SYSTEMS

(75) Inventors: Camille Chen, Cupertino, CA (US); Michael A. Robinson, Menlo Park, CA (US); Michael J. Giles, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1109 days.

(21) Appl. No.: 12/215,574

(22) Filed: Jun. 26, 2008

(65) Prior Publication Data
US 2009/0323652 A1 Dec. 31, 2009

(51) Int. Cl.
| H04W 4/00 | (2009.01) |
| H04W 72/00 | (2009.01) |
| H04W 88/00 | (2009.01) |
| H04W 92/00 | (2009.01) |

(52) U.S. Cl. ........ 370/329; 370/334; 370/338; 370/463; 370/465; 455/13.3; 455/63.4; 455/422.1; 455/450; 455/509

(58) Field of Classification Search .................. 370/329, 370/334, 338, 463, 465; 455/13.3, 63.4, 455/422.1, 450, 509
See application file for complete search history.

(56) References Cited

U.S. PATENT DOCUMENTS

| 6,646,505 | B2 * | 11/2003 | Anderson et al. ......... 330/124 R |
| 6,774,864 | B2 | 8/2004 | Evans et al. |
| 6,978,121 | B1 * | 12/2005 | Lane et al. ...................... 455/73 |
| 7,142,864 | B2 | 11/2006 | Laroia et al. |
| 7,224,704 | B2 | 5/2007 | Lu et al. |
| 7,253,783 | B2 | 8/2007 | Chiang et al. |
| 7,295,860 | B2 | 11/2007 | Suwa |
| 7,301,924 | B1 | 11/2007 | Gurbuz et al. |
| 7,352,332 | B1 | 4/2008 | Betts-LaCroix et al. |
| 7,352,688 | B1 | 4/2008 | Peralha et al. |
| 7,359,730 | B2 | 4/2008 | Dennis et al. |
| 7,362,275 | B2 | 4/2008 | Tu et al. |

(Continued)

FOREIGN PATENT DOCUMENTS

EP   1 653 672 A   5/2006

(Continued)

OTHER PUBLICATIONS

WI-FI (IEEE802.11) and Bluetooth Coexistence: Issues and Solutions, by Lior Ophir, Yigal Bitran, Itay Sherman, pp. 847-852, 0-7803-8523-3/04/ © 2004 IEEE.

(Continued)

*Primary Examiner* — Alpus H Hsu
(74) *Attorney, Agent, or Firm* — Gazdzinski & Associates, PC

(57) ABSTRACT

Methods and apparatus for selectively switching one or more antennas in a multiple-input, multiple-output (MIMO) antenna array so as to mitigate interference with another RF interface within the same space-constrained device, based on radio frequency isolation. In one embodiment, the MIMO interface comprises a WLAN interface having a 2×2 or 3×3 array of antennae which are placed in a wireless device in an asymmetric fashion with respect to the antenna of the second interface, and the other interface comprises a PAN (e.g., Bluetooth) interface operating in an overlapping frequency band (e.g., ISM band). When both interfaces are operating, interference is mitigated through selectively switching off one or more of the MIMO antennae, and using the remaining antenna(e) having the best isolation from the Bluetooth antennae. This approach allows simultaneous operation of both interferences without significant degradation to user experience or the operation of either interface, and may also provide power savings critical to mobile device battery longevity.

18 Claims, 9 Drawing Sheets

U.S. PATENT DOCUMENTS

| | | | |
|---|---|---|---|
| 7,366,244 B2 | 4/2008 | Gebara et al. | |
| 7,444,119 B2 | 10/2008 | Bekritsky | |
| 7,505,790 B2 | 3/2009 | Sheng-Fuh et al. | |
| 7,561,904 B2 | 7/2009 | Lagnado | |
| 7,574,179 B2* | 8/2009 | Barak et al. | 455/101 |
| 7,606,553 B2 | 10/2009 | Konaka | |
| 7,813,314 B2* | 10/2010 | Fulknier et al. | 370/328 |
| 2005/0141895 A1* | 6/2005 | Ruiz | 398/115 |
| 2005/0170776 A1 | 8/2005 | Siorpaes | |
| 2005/0208900 A1 | 9/2005 | Karacaoglu | |
| 2005/0276241 A1 | 12/2005 | Kamerman et al. | |
| 2006/0034217 A1 | 2/2006 | Kwon et al. | |
| 2006/0035653 A1 | 2/2006 | Karaoguz et al. | |
| 2006/0084383 A1 | 4/2006 | Ibrahim et al. | |
| 2006/0094364 A1 | 5/2006 | Hirota et al. | |
| 2006/0223450 A1 | 10/2006 | Dacosta et al. | |
| 2006/0292986 A1 | 12/2006 | Bitran et al. | |
| 2006/0292987 A1 | 12/2006 | Ophir et al. | |
| 2007/0060055 A1 | 3/2007 | Desai et al. | |
| 2007/0066227 A1 | 3/2007 | Duerdodt et al. | |
| 2007/0076649 A1 | 4/2007 | Lin et al. | |
| 2007/0109973 A1 | 5/2007 | Trachewsky | |
| 2007/0224936 A1* | 9/2007 | Desai | 455/41.2 |
| 2007/0232358 A1 | 10/2007 | Sherman | |
| 2007/0238483 A1 | 10/2007 | Boirequ et al. | |
| 2008/0089690 A1* | 4/2008 | Ruiz | 398/115 |
| 2008/0095263 A1 | 4/2008 | Xu et al. | |
| 2008/0125047 A1 | 5/2008 | Li et al. | |
| 2008/0192806 A1 | 8/2008 | Wyper et al. | |
| 2008/0224869 A1* | 9/2008 | Kaplan | 340/572.1 |
| 2008/0313315 A1* | 12/2008 | Karaoguz et al. | 709/222 |
| 2009/0176454 A1* | 7/2009 | Chen et al. | 455/63.1 |
| 2009/0257379 A1 | 10/2009 | Robinson | |
| 2009/0262669 A1* | 10/2009 | Sanders | 370/278 |
| 2010/0113090 A1* | 5/2010 | Lin et al. | 455/553.1 |

FOREIGN PATENT DOCUMENTS

| | | |
|---|---|---|
| EP | 1 906 555 | 4/2008 |
| JP | 2004032462 A | 1/2004 |
| WO | WO 2008001272 A | 1/2008 |
| WO | WO 2008041071 A | 4/2008 |

OTHER PUBLICATIONS

Coexistence Mechanisms for Interference Mitigation Between IEEE 802.11 WLANS and Bluetooth, by Carla F. Chiasserini and Ramesh R. Rao, IEEE Infocom 2002, pp. 590-598, 0-7-803-7476-2/02/ © 2002 IEEE.

* cited by examiner

WLAN transmit performance graph

METHODS AND APPARATUS FOR ANTENNA ISOLATION-DEPENDENT COEXISTENCE IN WIRELESS SYSTEMS

RELATED APPLICATIONS

This application is related to co-owned and co-pending U.S. patent application Ser. No. 12/006,992 filed Jan. 7, 2008 and entitled "Methods and Apparatus for Wireless Device Coexistence" and Ser. No. 12/082,586 filed Apr. 11, 2008 entitled "Methods And Apparatus For Network Capacity Enhancement For Wireless Device Coexistence", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to wireless communications system using multiple air interfaces and multiple antennas, including a multiple-in, multiple-out (MIMO) antenna.

2. Description of Related Technology

Wireless connectivity is becoming ubiquitously available and necessary in computing and entertainment products. Presently, many telecommunications products such as mobile phones, computers, media players, etc. come equipped with one or more wireless networking or communication interfaces.

In many cases, these network interfaces may include both wired and wireless network interfaces. Wireless network interfaces, also called "air interfaces", are of increasing interest due to the mobility and freedom they afford a user. Exemplary wireless networking technologies include WiFi (IEEE Std. 802.11a/b/g/n), WiMAX (IEEE Std. 802.16), PAN (IEEE Std. 802.15), IrDA, ultra wide band (UWB), Mobile Wideband (MWBA; IEEE-Std. 802.20), and others.

To increase the transmission bitrates of a wireless system, use of multiple antennae for transmission/reception has gained popularity. Such systems are called multiple-in, multiple-out systems (MIMO) and may employ multiple transmitting or multiple receiving antennae or both. See, e.g., IEEE-Std. 802.11n, which employs a MIMO approach in the context of a WLAN environment, as well as IEEE-Std. 802.16e (WiMAX), each of the foregoing being incorporated herein by reference in its entirety.

As a result of the growth in the total number of antennae used in communication, both due to multiple air interfaces and due to MIMO antenna systems, designers of hardware platforms are faced with a challenging task of optimal antenna placement. The problem is exacerbated when the form factor of a hardware platform is small or otherwise dimensionally or spatially constrained, thus giving a designer less flexibility in placing antennae on the hardware platform. Moreover, other factors which can affect antenna isolation and/or placement, including the use of a metallic housing or case for the device, present additional challenges.

Furthermore, since several radios have to support multiple bands, such as WLAN and WiMAX, the antenna size typically cannot be compromised to achieve acceptable performance.

Additionally, since certain isolation is required in order to obtain acceptable MIMO performance, extra burden is added to the design process in order to separate the antennas sufficiently to provide such isolation, even if these antennas are for the same radio.

One salient reason why antenna placement is of critical importance relates to the potential electromagnetic interference between two (or more) antennae. This interference may occur because these two antennae may be carrying communication data over two different air interfaces on a hardware platform, and may be using the same portion of the radio frequency spectrum (or spectrum portions close enough to create interference). For example, Bluetooth and IEEE-Std. 802.11n devices both operate in the 2.4-2.8 GHz Industrial-Scientific-Medical (ISM) band, and could potentially cause radio interference with one another. Similarly, WiMAX supports 2.3 GHz and 2.5 GHz bands; since WiMAX utilizes a comparatively high transmitter power, it can degrade Bluetooth performance significantly if the antenna isolation is not sufficiently high.

The degree of isolation between potentially interfering antennae impacts the severity of the interference problem. Isolation is generally a function of path loss, or attenuation, suffered by radio frequency (RF) signals from one antenna to the other. If the isolation between antennae of one air interface and antennae of another air interface is sufficiently large, then the interference with one another may be negligible. What is "sufficiently large" isolation may be implementation specific, and may depend on several factors such as receiver sensitivity.

In cases where the isolation is sufficiently large (e.g., >35 db between the first and second air interface antennae), solutions such as the adaptive frequency hopping (AFH) feature of Bluetooth can be employed to provide largely unencumbered simultaneous operation of the two interfaces (e.g., Bluetooth and WLAN).

However, when the isolation between an antenna pair is not sufficiently large (e.g., when the isolation from both antennas from one radio is not sufficiently large with respect to the other radio, such as for WLAN and Bluetooth coexistence cases where both WLAN antennas have less than 30 dB isolation with Bluetooth antenna), the multiple air interfaces may significantly interfere with each other's transmission. It is clearly desirable to mitigate such interference so as to avoid adverse effects on user experience (e.g., Bluetooth audio drop-outs during A2DP streaming playback, slow WLAN and Bluetooth transfer speeds, WLAN link drops, poor Bluetooth mouse tracking, streaming video jitter, etc.). One simple solution in prior art is to time-share or time-division multiplex the use of potentially interfering interfaces—that is, turn off one interface while the other interface is actively transmitting or receiving. However, this solution suffers from the drawback that it may result in an annoying and unsatisfactory user experience, wherein data connectivity on one interface may be broken or intermittent due to activity on the other air interface. For example, speech on a Bluetooth interface may come across segmented or choppy if the interface has to time-division multiplex with a WLAN air interface that is carrying data or voice communication on its air interface.

Other solutions have been proposed as well, including using antenna isolation for selecting transmit and receive antennas. For example, U.S. Pat. No. 6,774,864 to Evans, et al, entitled "Method of operating a wireless communications system," issued Aug. 10, 2004 discloses a method of selecting a combination of transmit antennas and receive antennas in a MIMO antenna system to give the best isolation from adjacent parallel signal streams comprises transmitting a first signal from one of the transmit antennas and measuring a quality metric, for example signal strength of the received signal at each of the receive antennas. The process is repeated using signals transmitted in turn by each the remaining transmit antennas. A channel matrix is compiled of the transmit antennas versus the receive antennas and a selection is made of a combination of transmit and receive antennas receiving acceptably a first signal and unacceptably a second signal and vice versa. The selected combination is used to send and receive MIMO signals. Switches are provided for coupling the selected antennas to the respective transmitters and receivers.

U.S. Pat. No. 7,366,244 to Gebara, et al. issued Apr. 29, 2008, and entitled "Method and system for antenna interference cancellation" discloses a wireless communication system which can comprise two or more antennas that interfere with one another via free space coupling, surface wave crosstalk, dielectric leakage, or other interference effect. The interference effect can produce an interference signal on one of the antennas. A cancellation device can suppress antenna interference by generating an estimate of the interference signal and subtracting the estimate from the interference signal. The cancellation device can generate the estimate based on sampling signals on an antenna that generates the interference or on an antenna that receives the interference. The cancellation device can comprise a model of the crosstalk effect. Transmitting test signals on the communication system can define or refine the model.

U.S. Pat. No. 7,362,275 to Tu, et al. issued Apr. 22, 2008 and entitled "Internal antenna and mother board architecture" discloses various embodiments of an internal antenna and motherboard architecture. In one embodiment, a wireless device may include a housing enclosing a first motherboard and a second motherboard. The ground plane of the first motherboard may be coupled to the ground plane of the second motherboard within the housing. The first motherboard and the second motherboard may act as an internal antenna system for the wireless device.

U.S. Pat. No. 7,359,730 to Dennis, et al. issued Apr. 15, 2008 and entitled "Method and apparatus for reducing interference associated with wireless communication" discloses a method and apparatus for reducing interference associated with wireless communication in an area having sensitive electronic equipment. A wireless communications device receives, from an access point, a signal having a signal strength above a predetermined threshold. The wireless communications device determines a transmission power level maximum based on the received signal and then transmits a signal to the access point at a transmission power level at or below the transmission power level maximum. The wireless communications device disables the transmission when the signal strength falls below the predetermined threshold.

U.S. Pat. No. 7,352,332 to Betts-LaCroix, et al. issued Apr. 1, 2008 and entitled "Multiple disparate wireless units sharing of antennas" discloses, in one embodiment, an apparatus including, but is not limited to, a first wireless communication unit of a first wireless communication standard, where the first standard includes selecting one of two antennas provided. The apparatus further includes a second wireless communication unit of a second wireless communication standard, where a first antenna and a second antenna are shared by the first and second communication units. Other methods and apparatuses are also described.

U.S. Pat. No. 7,295,860 to Suwa issued Nov. 13, 2007 and entitled "Radio communication apparatus" discloses a radio communication apparatus which comprises a radio unit capable of transmitting or receiving a first radio communication signal of a Bluetooth standard and a second radio communication signal of a cordless phone standard and a synchronism discriminator for discriminating a radio communication standard signal. The radio communication apparatus switches between first and second radio communication modes in response to a discrimination result of the synchronism discriminator, detects a type and a weight of a sound error every mode, and adds or subtracts the weight of the sound error in a present slot to or from a weight of a sound error in the previous slot in response to a degree of the sound error in the present slot. This structure allows a single apparatus to transmit or receive both of two kinds of radio communication standard signals, and the sound error is adequately and precisely handled in response to the type and weight of the sound error, thereby improving quality of the sound signal cancellation.

U.S. Pat. No. 7,253,783 to Chiang, et al. issued Aug. 7, 2007 and entitled "Low cost multiple pattern antenna for use with multiple receiver systems" discloses an antenna assembly including at least two active or main radiating omnidirectional antenna elements arranged with at least one beam control or passive antenna element used as a reflector. The beam control antenna element(s) may have multiple reactance elements that can electrically terminate it to adjust the input or output beam pattern(s) produced by the combination of the active antenna elements and the beam control antenna element(s). More specifically, the beam control antenna element(s) may be coupled to different terminating reactances to change beam characteristics, such as the directivity and angular beamwidth. Processing may be employed to select which terminating reactance to use. Consequently, the radiator pattern of the antenna can be more easily directed towards a specific target receiver/transmitter, reduce signal-to-noise interference levels, and/or increase gain. A Multiple-Input, Multiple-Output (MIMO) processing technique may be employed to operate the antenna assembly with simultaneous beam patterns.

U.S. Pat. No. 7,142,864 to Laroia, et al. issued Nov. 28, 2006 and entitled "Methods and apparatus of enhancing performance in wireless communication systems" discloses methods and apparatus for supporting and using multiple communications channels corresponding to different transmit technologies and/or access technologies in parallel within a cell of a wireless communications system. Mobile nodes support multiple technologies and can switch between the technology being used at a particular point in time, e.g., from a first channel corresponding to a first technology to a second channel corresponding to a different technology which provides better transmission characteristics, e.g., a better perceived channel quality. Mobiles maintain at least two sets of channel quality information at any one point in time. Mobiles select the better channel and communicate the channel selection to the base station or communicate channel quality information for multiple channels to the basestation and allow the base station to select the channel corresponding to the technology providing the better conditions for the mobile. Different mobiles in the same cell may support different technologies.

United States Patent Publication No. 20080095263 to Xu et al. published Apr. 24, 2008 entitled "Method And Apparatus For Selection Mechanism Between OFDM-MIMO And LFDM-SIMO" discloses systems and methodologies that facilitate switching between various combinations of MIMO, SIMO, SISO and OFDM, LFDM and IFDM. According to various aspects, a method for a wireless communication network is provided that includes: receiving a first set of data information, wherein the first set of information comprising a first value, determining if the first value is above a threshold and transmitting an indication to switch to using a first transmission technique if determined that the first value is above the threshold.

United States Patent Publication No. 20070238483 to Boirequ et. al published Oct. 11, 2007 entitled "Antenna sharing techniques" discloses a mobile computing device may comprise an antenna, a switch to couple to the antenna, and multiple transceivers to couple to the switch. The mobile computing device may also comprise an antenna management module to couple to the switch and the transceivers. The antenna management module may control the switch to electrically connect one of the transceivers to the antenna. Other embodiments may be described and claimed.

United States Patent Publication No. 20070076649 to Lin et. al published Apr. 5, 2007 entitled "Techniques for heterogeneous radio cooperation" discloses a cooperative communications manager module which establishes a first wireless link with a client device using a first channel frequency and dispatches a first message to the client device over the first channel frequency. The cooperative communications manager module establishes a second wireless link with a destination node and controls the cooperative transmission of the first message simultaneously with the client device to the destination node over the second wireless link using a second channel frequency.

United States Patent Publication No. 20060223450 published Oct. 5, 2006 to Dacosta et al. entitled "Method and apparatus to resist fading in MIMO and SIMO wireless systems" discloses a wireless communication system, the receiver includes a first plurality of receive chains and a second plurality of antennas. Each receive chain is selectively connectable to selected antennas. The antennas are selected based on criteria obtained from a received RF signal to produce an antenna configuration connected to the receive chains to reduce RF fading at the receiver. An electronic switch connects the antennas to the receive chains. The receiver is programmed to determine which antenna should be connected to each receive chain by the switch by measuring characteristics of the received signal for each allowed antenna configuration and selecting the best antenna configuration. Transmitters may be similarly configured.

United States Patent Publication No. 20060034217 published Feb. 16, 2006 to Kwon et al. entitled "Method and network device for enabling MIMO station and SISO station to coexist in wireless network without data collision" discloses a method of enabling a multi-input multi-output (MIMO) station and a single input single output (SISO) station to coexist in a wireless network and a wireless network device. The method includes receiving information on a station when the station accesses a wireless network, setting coexistence information by comparing a number of antennas of the station accessing the wireless network with a number of antennas of a plurality of stations constituting the wireless network, and transmitting a frame containing the coexistence information to the plurality of stations constituting the wireless network.

Despite the foregoing variety of approaches to MIMO and multiple air interface co-existence, there is a need for an improved method and apparatus for mitigating potential interference between antennae of different air interfaces on the same hardware platform. Specifically, a salient need exists for a solution which addresses platforms that are highly space-constrained or otherwise necessarily result in low isolation values between the antennae of the various air interfaces of the platform (for example, WiFi/WLAN and Bluetooth, WiMAX and Bluetooth, WLAN and UWB). Such an improved solution would ideally permit for good user experience (i.e., devoid of any significant audio or data drop-outs, effects on data streaming rate, preclusion of use of one interface when another is being used, and so forth which would adversely affect user satisfaction) and be absent significant operation restrictions with respect to the multiple air interfaces (e.g., allow two or more interfaces to operate simultaneously in at least partial capacity), while still obeying the platform or form-factor limitations such as those present in extremely small hand-held or laptop computing devices, or those with metallic cases which inherently present challenges to antenna placement.

SUMMARY OF THE INVENTION

The present invention satisfies the aforementioned needs by providing improved apparatus and methods for air interface coexistence.

In a first aspect of the invention, a method of operating a wireless device having at least first and second air interfaces is disclosed. In one embodiment, the first air interface comprises at least two antenna elements, the second interface comprising another antenna element, and the method comprises: determining the isolation between individual ones of the at least two antenna elements of the first interface and the another antenna element of the second interface; selecting at least one of the at least two elements of the first interface for operation; and simultaneously operating the first and second interfaces within a common frequency band using the selected one of the at least two elements of the first interface, and the another element of the second interface, respectively.

In one variant, the isolation between the first antenna element of the at least two antenna elements of the first interface and the another antenna element of the second interface is substantially unequal to that between the second antenna element and the another antenna element.

In another variant, the first interface comprises a high data rate WLAN interface, and the second interface comprises a lower data rate personal area networking (PAN) interface, and the simultaneously operating comprises operating within a band comprising a frequency of 2.4 GHz. The act of selecting comprises operating one antenna element circuit associated with the selected antenna element, and not operating the antenna element circuit associated with the non-selected ones of the at least two elements.

In yet another variant, the simultaneous operation comprises simultaneously operating without use of a time-sharing or time-divided spectral access scheme.

In a further variant, the placement of the at least two antenna elements of the first interface and the another antenna element of the second interface within the wireless device does not permit isolation levels between the at least two elements and the another element sufficient for simultaneous operation of all of the at least two elements and the another element without significant degradation of the data rate of the WLAN interface.

In a second aspect of the invention, a method of operating a MIMO-capable air interface of a device is disclosed. In one embodiment, the device has at least one additional air interface, and the method comprises: communicating from the one other air interface to the MIMO-capable interface communication activity level on the one other air interface; if the MIMO-capable interface and the one other air interface are operating simultaneously, then determining a radio frequency isolation between the at least two antenna elements of the MIMO-capable interface and the one other air interface; and based at least in part on the communicated activity level and the determined isolation, configuring the MIMO-capable interface to operate a first number of the antenna elements.

In one variant, the determining comprises determining a static isolation.

In another variant, the determining is responsive to physical layout of antennae of the device.

In yet another variant the determining comprises determining a time-variant isolation.

In still a further variant, the determining is based at least in part on an attenuator setting. The attenuator setting is obtained from front end radio circuitry of at least one of the MIMO-capable interface and the one additional interface.

In another variant, the communicating comprises communicating using a hardware-based signal.

Alternatively, the communicating may comprise communicating using a software message.

In another variant, the method further comprises classifying the radio frequency isolation as one of symmetric or asymmetric. If the radio frequency isolation is classified as asymmetric, then the first number of antenna elements is 1.

In a third aspect of the invention, apparatus having multiple air interfaces is disclosed. In one embodiment, the apparatus comprises: a plurality of first antenna elements configured to communicate on a first air interface; at least one second antenna element configured to communicate on a second air interface; first front end circuitry operatively coupled with the plurality of first antenna elements, the circuitry enabling transmitting and receiving signals over the first interface; second front end circuitry operatively coupled with the at least one second antenna element, the second circuitry enabling transmitting and receiving signals over the second interface; a communication channel between the interface and the second interface and adapted to carry activity information; and a processor communicatively coupled to the first front end circuit and the second front end circuit. The processor is configured to: determine the isolation between antennae pairs formed from the plurality of first antenna elements and the at least one second antenna element; evaluate whether the isolations are symmetric or asymmetric; and based at least in part on the evaluation, not using of at least one antenna element from the plurality of first antennae.

In one variant, the first front end circuitry comprises front end circuits for each of the antenna elements of the plurality, and the not using comprises turning off at least a portion of the front end circuits.

In another variant, the not using comprises not using if the isolations are evaluated to be asymmetric.

In a further variant, the apparatus comprises a portable computerized device having a substantially metallic outer case.

In another variant, the first interface comprises a WLAN interface having MIMO capability, and the second interface comprises a personal area network (PAN) interface. The placement of the plurality of first antenna elements of the WLAN interface and the at last one second antenna element of the PAN interface within the apparatus does not permit isolation levels between the plurality of first elements and the at least one second element sufficient for simultaneous operation of all of the plurality of first elements and the at least one second element without significant degradation of the data rate of the WLAN interface.

In yet a further variant, the processor is configured to detect the isolations as a function of at least one of: (i) the physical placement of the plurality of first antenna elements; (ii) an operational setting of the first front end circuitry; and (iii) an operational setting of the second front end circuitry.

In yet another variant, wherein the communication channel comprises one or more hardware-based channels adapted to carry signals from the second interface to the first interface.

In a fourth aspect of the invention, wireless portable apparatus adapted for data communication over first and second air interfaces is disclosed. In one embodiment, the apparatus comprises: a first air interface having at least two antennae associated therewith; a second air interface having at least one antenna associated therewith, the first and second air interfaces operating in a substantially overlapping frequency band, the at least two antenna of the first interface being disposed within the apparatus asymmetrically with respect to their isolations with the at least one antenna of the second interface; a processor; and a storage device, the storage device comprising a computer program having a plurality of instructions that when executed: determine if the potential for interference between the first and second air interfaces exists; and if the potential exists, turning at least one of the at least two antennae off so as to mitigate the interference.

In one variant, the first interface comprises a MIMO wireless LAN (WLAN) interface; the second interface comprises a personal area networking (PAN) interface; and the turning at least one of the at least two antenna off comprises disabling transmission or reception via one of the at least two antennae that has the lowest isolation with the at least one antenna of the PAN interface.

In another variant, the apparatus comprises a portable computerized device having a clamshell-like outer case, and the at least two antennae of the WLAN interface and the at least one antenna of the second interface are all disposed substantially within a hinge region of the clamshell-like case.

In a further variant, the outer case is substantially metallic.

In yet another variant, the determination of the potential for interference comprises determining whether both first and second interfaces are transmitting or receiving at the same time.

In a fifth aspect of the invention, a computer readable apparatus having a storage medium is disclosed. In one embodiment, the medium is adapted to store a computer program comprising instructions which, when executed: detect an asymmetric isolation condition by comparing the isolations between antennae of a plurality of antenna pairs associated with first and second air interfaces; and turns on or off, responsive to the asymmetric condition, use of at least one antenna within the first interface, the first interface comprising a multi-input, multi-output (MIMO) air interface.

In a sixth aspect of the invention, a method of doing business relating to a wireless device is disclosed. In one embodiment, the method comprises: receiving a plurality of user inputs regarding a desired configuration of the device; based at least in part on the inputs, determining the placement of a plurality of antennae within the device, the plurality of antenna comprising two or more antennae associated with a MIMO-enabled air interface and one or more antennae associated with a second air interface; and configuring the device during build so as to selectively activate or deactivate at least one of the two or more antennae during conditions of simultaneous operation of the MIMO-enabled and second air interfaces so as to mitigate the effects of interference there between.

In one variant, the act of receiving comprises receiving the inputs via an Internet website.

In another variant, the act of receiving comprises receiving the inputs requiring the device to have at least the MIMO-enabled interface and the second interface, the MIMO-enabled interface comprising a WLAN interface compliant with IEEE-Std. 802.11n, and the second interface comprising a PAN interface capable of operating in substantially the same frequency spectrum as the MIMO-enabled interface.

In a further variant, the act of determining the placement comprises determining a placement wherein the isolation between individual ones of the two or more antenna of the MIMO-enabled interface and the one or more antennae of the second interface is not equal.

In yet another variant, the act of determining the placement is based at least in part on isolation values obtained during testing of a prototype of the device, the prototype having a substantially similar configuration to that of the wireless device as requested by the user.

In a seventh aspect of the invention, a method of operating a device having at least first and second air interfaces is disclosed. In one embodiment, the method includes: communicating on the first air interface via a plurality of first antenna elements, communicating on the second air interface via at least one second antenna element, determining the isolation isolations between antennae pairs formed from the plurality of first antenna elements and the at least one second antenna element, and evaluating whether the isolations are symmetric or asymmetric. Based at least in part on the evaluation, a subset of the plurality of first antennae antenna elements is enabled. The first and second air interfaces are in one variant additionally coordinating activity information via a distinct communication channel.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
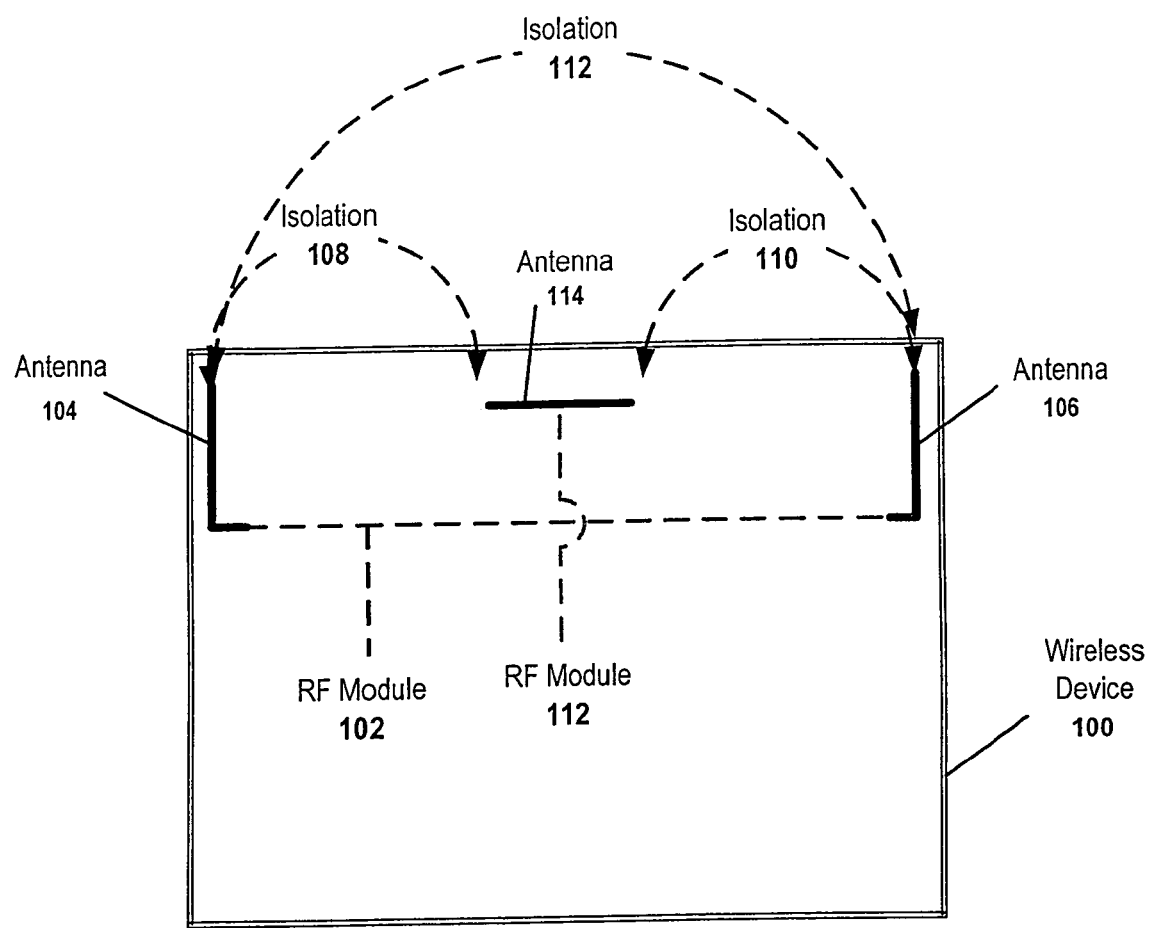
FIG. 1 is a block diagram showing exemplary placement of antennae having symmetric isolation among various constituent antenna pairs.

As used herein, the term "Bluetooth" refers without limitation to any device, software, interface or technique that complies with one or more of the Bluetooth technical standards, including Bluetooth Core Specification Version 1.2, Version 2.0, and Version 2.1+ EDR.

As used herein, the terms "client device", "end user device" and "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "WiFi" refers to, without limitation, any of the variants of ANSI/IEEE-Std. 802.11 ("Information technology—Telecommunications and information exchange between systems—Local and metropolitan area networks—Specific requirements—Part 11: Wireless LAN Medium Access Control (MAC) and Physical Layer (PHY) Specifications") or related standards including 802.11 a/b/e/g/n, each of the foregoing being incorporated herein by reference in its entirety.

As used herein, the term "wireless" means any wireless signal, data, communication, or other interface including without limitation WiFi, Bluetooth™, 3G, HSDPA/HSUPA, TDMA, CDMA (e.g., IS-95A, WCDMA, etc.), FHSS, DSSS, GSM, PAN/802.15, WiMAX (802.16), MWBA (802.20), narrowband/FDMA, OFDM, PCS/DCS, analog cellular, CDPD, satellite systems, millimeter wave or microwave systems, acoustic, and infrared (i.e., IrDA).

Overview

The present invention discloses inter alia methods and apparatus for providing optimized performance for transceivers in multiple antenna/multiple air interface systems. In one exemplary implementation, the apparatus comprises a wireless communication device having two air interfaces: (i) a personal area network (PAN) interface such as a version of the Bluetooth protocol suite or other such technology (e.g., IEEE Std. 802.15.1, 802.15.3, and so forth); and (ii) a wireless local area network (WLAN) interface such as an interface compliant with the IEEE Std. 802.11 a/b/g/n specification, and the multiple antenna system is a Multiple In-Multiple Out (MIMO) system as specified in the 802.11n specification.

As previously noted, prior solutions to mitigating the effects of interference between two co-located air interfaces have not explicitly considered the case of spatial diversity (i.e., MIMO). In such a case, the isolation between various antennae within the diversity group may not be symmetric, and hence the methods and apparatus of the present invention seek to address this prior art shortcoming. This is accomplished in one embodiment through use of a software algorithm which evaluates the operational status of various components (e.g., whether the PAN interface is active), and whether overlapping spectrum is used, and based on the isolation characteristics of the various PAN and WLAN antennae, selects either a MIMO or SISO mode of operation for the WLAN interface.

Additionally, the methods and apparatus of the present invention are particularly useful in devices that cannot either achieve high isolation between the various antennae due to size restrictions (i.e., the enclosure or form factor is simply not large enough to provide the necessary level of isolation). Such devices may include for example very small or thin-profile laptop computers or even some handheld devices. This need is particularly acute where other factors besides the aforementioned space restrictions come into play for antenna isolation; e.g., use of more than a 2×2 MIMO configuration (e.g., 3×3), use of a metal housing for the device, and/or use of yet added or different air interfaces (e.g., WiMAX, GPS, UWB, etc.).

Moreover, the present invention advantageously does not require the use of time-sharing approaches as in the prior art. Specifically, as previously discussed, WLAN/Bluetooth time-sharing is a popular solution for most small form factor systems, yet has a pronounced negative impact on WLAN overall network capacity (even with WLAN "power saving mode" activated), and can cause additional unwanted complexity in managing which interface gets access to the spectrum when. In contrast, the methods and apparatus of the present invention allow simultaneous (non-time divided or shared) WLAN and Bluetooth operation, with little or no adverse effect on WLAN network capacity.

The present invention further provides savings of platform power (e.g., reduces battery drain in mobile devices) by avoiding unnecessary collisions. By using a SISO mode and Bluetooth simultaneously, one WLAN Tx/Rx chain is powered off, which saves WLAN total power. As the SISO and Bluetooth antenna isolation is maintained at a reasonable and useful level, collision between the interfaces are minimized.

Business methods associated with the foregoing technology are also described.

Detailed Description of Exemplary Embodiments

Exemplary embodiments of the present invention are now described in detail. While these embodiments are primarily discussed in the context of BT and WLAN (e.g., IEEE-Std. 802.11) coexistence scheme, it will be recognized by those of ordinary skill that the present invention is not limited to any two particular wireless protocols. In fact, the principles discussed herein are equally applicable to any number of wireless protocols which at least partly share frequency spectrum, and with which antenna isolation or spectrum bandwidth problems occur as a result of the two or more wireless protocol implementations being substantially co-located with one another. For example, the Apple TV™ digital media receiver sold and marketed by the Assignee hereof, utilizes both WLAN 802.11 and wireless universal serial bus (USB) air interfaces. The WLAN and wireless USB interfaces share the same spectrum (i.e., ISM band), and hence could also benefit from the coexistence solutions discussed subsequently herein. Similarly, devices having WiFi and WiMAX (IEEE Std. 802.16) interfaces, whether with or without a PAN interface, may also benefit. Similarly, a cellular data interface operating in the same spectrum (e.g., EV-DO or similar, such as the UM-150 broadband access device offered by Verizon™) Myriad other combinations of different air interfaces utilizing at least a portion of the same spectrum will also be recognized by the ordinary artisan given this disclosure.

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (labeled "A", "B" and "C" for purposes of this discussion), yet the most common operating mode for the user device is where only two of the three interfaces are operated simultaneously. Depending on which of the three interfaces are being operated at a given time, the policies or rules applied may be different. For example, interface A might have significant mutual interference issues with interface B, but not with interface C. Similarly, interface C might have significant issues with interface B, but not A. So, the present invention explicitly contemplates the dynamic selection and application of one or more operating policies or configurations based on a determination of which interfaces are operating at a given time.

Antenna Isolation—

FIG. 1 shows an exemplary wireless device 100 having two RF modules: (i) a first module 102, representing a WLAN air interfaces, connected to a first antenna pair (i.e., antenna 104 and another antenna 106); and (ii) a second RF module 112 connected to another antenna 114 and representing a PAN (personal area network) air interface. FIG. 1 shows that the antenna 104 of the WLAN air interface pair and antenna 114 of the PAN air interface have a certain isolation 108 separating them. Similarly, antenna 106 and antenna 114 are separated by another isolation 110. Because RF isolation is often dependent on the placement of the antenna, the values of the isolations 108, 110 will often be comparable or even equal to each other. This layout of antennae is termed as the "symmetric isolation" case for purposes of this discussion. In general, the symmetric isolation case may include antenna configurations wherein the value of isolation between each antenna of a first RF interface are within a prescribed range or threshold (e.g., D1) of each other.

Symmetric isolation may further have different subtleties associated therewith. For example: (a) isolation 108 and isolation 110 may each be relatively small and below a low threshold (e.g., 15 dB); (b) isolations between all WLAN antennae (104, 110) and the PAN antenna 114 are below a medium threshold (e.g., 30 dB); and (c) isolations between each of the WLAN antennae and the PAN antenna are above a high threshold (e.g., 35 dB).

Some wireless devices may not exhibit the symmetric isolation described above. In such devices, due to the placement of antennae and/or interposed or proximate components for example, differences in the isolation between antenna pairs may exceed the prescribed threshold (D1). This is referred to as an "asymmetric isolation" case.

Figure 2:
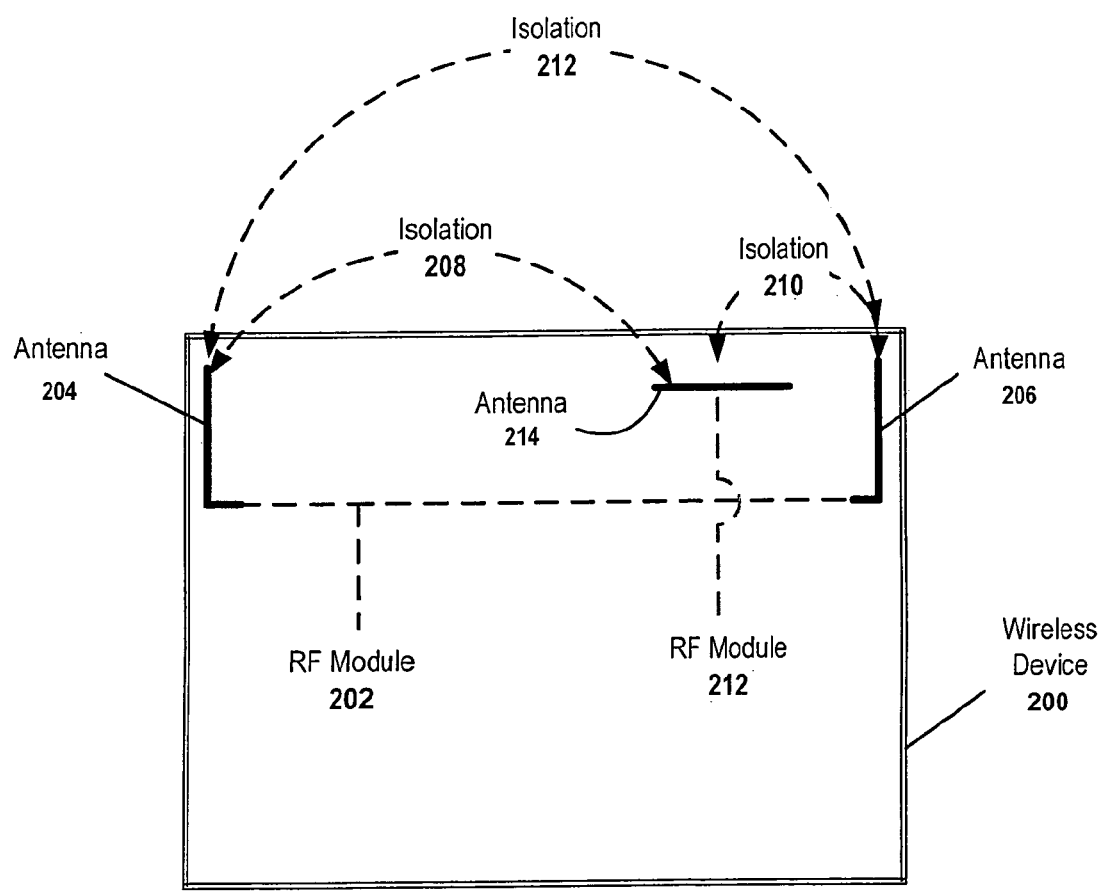
FIG. 2 is a block diagram showing exemplary placement of antennae having asymmetric isolation among various constituent antenna pairs.

FIG. 2 shows an exemplary wireless device 200 exhibiting asymmetric isolation. The wireless device 200 has two RF modules: (i) a first RF module 202, representing a WLAN air interfaces, connected to an antenna 204 and another antenna 206, and (ii) a second RF module 212 connected to antenna 214 and representing a PAN air interface. FIG. 2 shows that antenna 204 of the WLAN air interface and antenna 214 of the PAN air interface have a given isolation 208 separating them. Similarly, antenna 206 and antenna 214 are separated by another value of isolation 210. The values of the two isolations 208, 210 may significantly differ from one another due to any number of factors. Note that when antennae of a wireless device 200 are placed in asymmetric isolation, some antenna pairs may still have fairly high isolation between them (generally a desired feature). For example, the antennas 204, 214 in FIG. 2 may have high isolation between them, and the antennas 204, 210 may have high isolation between them also, but the antennas 214, 210 may have a low isolation between them.

Antenna isolation may also depend on the design of the RF circuitry of the air interfaces. For example, some embodiments may employ a dynamic attenuator in front of the RF circuitry to attenuate incoming RF signal. Such a dynamic attenuator circuit may be configured to provide e.g., a constant power input signal to a low noise amplifier (LNA) block of the RF front end that receives incoming signals. Isolation between antennae may therefore change, responsive to the level of isolation applied by the RF circuitry, so as to optimize receipt of data. Therefore, in general, antenna isolation may have at least two components: (i) a fixed, "layout based" component; and (ii) a variable dynamic attenuator based component.

Methods—

Figure 3:
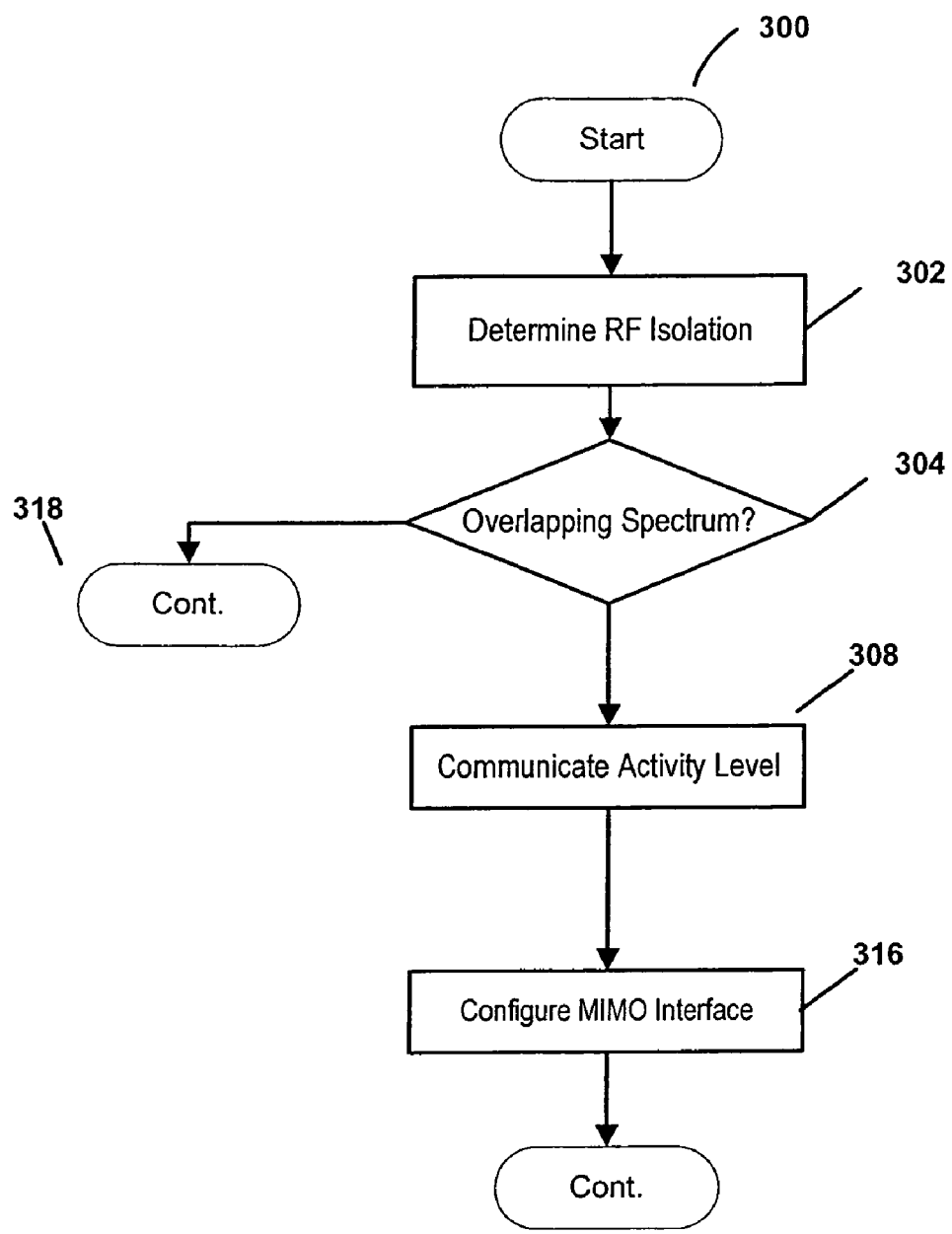
FIG. 3 is a logical flowchart showing one embodiment of a generalized method of providing coexistence in a wireless device with asymmetric antenna isolations in accordance with the present invention.

FIG. 3 shows a flowchart illustrating one exemplary embodiment of a wireless "coexistence" method 300 in the context of a wireless device (e.g., the device 200 of FIG. 2).

At step 302 of the method 300, the wireless device 200 determines the RF isolation among various antennae present on the wireless device 200. In general, the wireless device 200 may have M air interfaces, where M=1, identified as $I_1$ through $I_M$. Each air interface will in turn have one or more transmit antennas and one or more receive antenna (which may physically be the same antenna). The term $T_k$ represents the number of transmit antennae for the $k^{th}$ air interface $I_k$, and the term $R_k$ represents the number of receive antennae for the kth interface $I_k$. The step 302 of determining the isolation may generally involve looking at each pair of antenna for each of interface $I_k$ and $I_n$ where k≠n, and pairing up each of $T_k$ transmit and $R_k$ receive antennae from the $k^{th}$ interface with each of $T_n$ transmit and $R_n$ receive antennae on the $n^{th}$ interface. For each antenna pair—an antenna from the $k^{th}$ air interface and an antenna from the $n^{th}$ interface, the calculation for determining isolation may involve two steps.

First, the wireless device 200 may have pre-existing information regarding placement of these antennae on the device and the resulting isolation. This a priori information, for example, may be calculated by a designer of the wireless device and programmed in the isolation calculation algorithm (software or firmware) or stored in an onboard storage device (e.g., memory). The contribution of this component of the isolation depends on the physical placement of the antennae, and may largely be time invariant.

Second, the wireless device 200 may calculate a time-variant component of the isolation between the two antennae. The time-variant component may depend on operational settings of the front-end circuitry connected to each of the antennae for which the isolation is being determined. It is well known in the art that front-end circuitry may employ a technique, commonly known as "dynamic attenuation", to change the gain of received signal. The dynamic attenuation may in turn depend on the setting of an automatic gain control (AGC) circuit. Generally speaking, when the dynamic attenuator is set for higher attenuation setting, this will result in better isolation from an interfering antenna because the interference will be attenuated more by the dynamic attenuator. The wireless device 200 may be configured to obtain an attenuator setting from the front-end radio circuitry, where signal processing techniques such as the AGC are implemented, for one or more of the air interfaces of the device 200.

Using the isolation values among the antenna pairs, the wireless device 200 may then decide whether the device currently has symmetric or asymmetric attenuation. For example, in one exemplary embodiment of the invention, the wireless device 200 may decide that it is currently operating in "symmetric attenuation" mode if it is determined that:

(1) the isolation between each antenna of air interface k and each antenna of air interface n is below a prescribed low threshold (e.g., 15 dB). The low threshold may be dependent for example on the design of front-end circuitry of air interfaces k and n; OR (2) the isolation between each antenna for air interface k is below a first "medium" threshold, and the isolation between each antenna of air interface k and each antenna of air interface n is below a second medium threshold. In one variant, the first medium threshold and the second medium threshold are equal (e.g., both equal to 30 dB), but they may also be different if desired; OR (3) if isolations as calculated in step (2) above are above a designated "high" threshold (e.g., 35 dB).

It will be appreciated that the use of "static" thresholds in the exemplary embodiment above is for illustrative purpose only, and not a design requirement. In another exemplary embodiment for example, the wireless device 200 may use different thresholds for different air interfaces.

In a further embodiment, one or more of the threshold values may be dynamically varied based on e.g., then-prevailing operational conditions (such as the position of a movable portion of the device 200, such as the "flip-up" screen portion of a laptop computer, or the open/closed position of a clamshell-type mobile phone, which may affect the isolation or other relevant parameters).

In yet another embodiment, a wireless device 200 may not use thresholds at all, but may use other quantitative measures in deciding whether isolations are symmetric. Stated differently, the decision regarding whether the layout of antennae is "symmetric" or "asymmetric" may itself depend on which ones of the techniques described herein results in a higher (better) throughput on one or more of the air interfaces.

One important characteristic of symmetric attenuation is that individual isolations between antenna pairs are close enough to each other so that when one examines different antennae of a first air interface from the perspective of an antenna of another (second) air interface, no antenna is exceedingly "better" or exceedingly "worse" than other antennae of that first air interface in terms of isolation. Therefore, there may be little if any incentive to treat one antenna preferentially over another antenna.

In step 304, the wireless device 200 may check if the current operations of air interface k and interface n are such that their spectra are either overlapping, or close enough to cause interference into one another. For example, the air interfaces may be both operating in the ISM frequency band. This overlap may also be presumed based on e.g., design parameters of the device, thereby obviating step 304. For instance, if Air Interface A is operating to transmit or receive, and Air Interface B is operating to transmit or receive at the same time as Interface A, then "overlap" may be presumed based on a priori knowledge of the design parameters of each interface. However, in the case of interfaces which are more frequency-agile, or which various operating modes which may have differing spectral overlap with the other air interface(s) such as Bluetooth adaptive frequency hopping (AFH) or the like, then a more sophisticated analysis may be performed to determine if any meaningful or deleterious overlap will occur (and even the severity thereof).

Step 304 may be device implementation-specific as well. For example, depending on the bandpass filter on the input side of an air interface, an interfering signal in the next channel (e.g., 24 MHz away) may or may not detrimentally interfere with the wireless device 200.

If, in step 304, the wireless device decides that the current operation of the two antennae being evaluated for isolation is non-interfering, then in step 318, the wireless device may continue with isolation calculations for the next antenna pair and may continue monitoring the current antenna pair for any operational changes (e.g., frequency change on one of the air interfaces).

Otherwise, the wireless device 200 may continue with step 318 of communicating activity level at each antenna in the antenna pair to the other antenna (which may need be only one-way in the case of a BT/MIMO WLAN antenna pair; i.e., from BT to WLAN). In some embodiments, the wireless device 200 may be configured to communicate the activity level at all times, but may use the activity level only when overlapping spectrum is detected in step 304 (and an appropriate isolation condition is determined in step 302).

Additionally, the activity level of the interface itself can be used as a basis of determining whether a given antenna element (or set of elements) is/are in operation (e.g., BT_Active for a Bluetooth interface). If the interface is off, then the antenna are surely not radiating or receiving signals. However, the converse is not always true; i.e., if the interface is "on", it none-the-less may still not be radiating or receiving signals (e.g., it may be in a sleep mode or other such state).

The wireless device 200 may achieve the communication in step 308 either by a hardware signal, by a software signal, or by any combination or hybridization of the two. In one embodiment, a signal line (or multiple signal lines) may be configured between the antenna pair to carry activity level signals (e.g., changes in voltage or current level). The wireless device 200 may be configured to convey activity as a binary variable: e.g., Activity "ON" from antenna A to antenna B indicates that antenna A is using its air interface for transmitting (or receiving) a signal, while Activity "OFF" may in turn indicate that antenna A is not using its air interface, and is therefore not emitting or receiving any signal. In some embodiments, the wireless device 200 may be configured to communicate activity level in step 308 as a software signal. This communication may be implemented using any of the well-known software techniques including, but not limited to, inter-process signals, mutex, pipes, application programmer interface (API) call, a flag set instruction execution, write to or read from a storage location, transmitted message or packet, or other such mechanism. Any number of different approaches will be recognized by those of ordinary skill given the present disclosure.

One embodiment of the present invention utilizes a software signaling mechanism to make one air interface (e.g., WLAN) aware of the activity or activity level of the other air interface (e.g., Bluetooth). Broadly speaking, such a software embodiment may be either use "push" or a "pull" model. In "push" model, one radio interface may "push" its information to the other radio interfaces. In response to the signal, the other radio interface may then take actions such as changing antenna use, and so on. In "pull" mode, a radio interface may, from time to time, check on activity of other radio interfaces (e.g., by periodic polling or the like) to see if any action needs to be taken.

It will be recognized that these push/pull models can be used in tandem if desired, such as where a first interface utilizes a "push" model with respect to providing its information to the second interface, while using a pull model with respect to obtaining information from the second interface. Moreover, the various techniques may be used selectively by the same interface during different operational circumstances.

In one variant of the invention, signaling from the PAN to the WLAN interface is used for effecting the MIMO to SISO switch. However, other signals may be employed as well, such as for example where the WLAN interface sends signals to the PAN interface for other purposes such as debug or "wake-up" based on the WLAN signal. Similarly, signals from the PAN interface to the WLAN may be utilized, such as for example when the PAN enters a sleep mode, it may inform the WLAN of this state change.

Returning again to FIG. 3, in step 316, the wireless device 200 may use the information regarding attenuations between all antenna pairs to configure use of the antennae in a variety of different ways. In one embodiment, the wireless device turn offs or on antennae (and any associated transmit/receive circuitry, or "chain") as shown in, Table 1. For example, if the PAN air interface is idle (corresponding to the second row of Table 1), then the WLAN device may be configured to operate in MIMO configuration both when WLAN operates in a overlapping or in a non-overlapping spectrum. On the other hand, if PAN air interface is active, corresponding to the third row of Table 1, WLAN interface may be configured to operate in MIMO mode when operating in non-overlapping spectrum and SISO mode when operating in overlapping spectrum.

TABLE 1

| PAN | WLAN: non-overlapping spectrum | WLAN: Overlapping spectrum |
| --- | --- | --- |
| Idle | MIMO | MIMO |
| Active | MIMO | SISO |

Table 2 shows exemplary decision table implemented in step 316 of the method 300 by a wireless device 200 for a system with 3 transmit/receive antennae. The first three columns of Table 2 indicate the relative isolation of each WLAN antenna from the PAN antenna. As shown in row 2, when each antenna isolation is high, the WLAN air interface is operated in 3×3 MIMO mode. However, in row 3, when two antennae have high isolation, but one does not, the wireless device 200 may choose to operate the WLAN air interface in 2×2 MIMO mode by turning off the front-end circuitry for the third (lower isolation) antenna. Row 7 shows another decision possibility; i.e., when isolation of each antenna is low. In this case, the WLAN device 200 may choose to operate the WLAN air interface in 3×3 MIMO, because it may not be possible to exploit any advantage of turning off some antenna while still maintaining high throughput on the WLAN interface.

TABLE 2

| Antenna 1 isolation | Antenna 2 isolation | Antenna 3 isolation | Operational mode when PAN active |
| --- | --- | --- | --- |
| High | High | High | 3 × 3 MIMO |
| High | High | Low | 2 × 2 MIMO |
| High | Low | Low | 1 × 1 SISO |
| High | Low | High | 2 × 2 MIMO |
| Low | High | High | 2 × 2 MIMO |
| Low | High | Low | 1 × 1 SISO |
| Low | Low | Low | 3 × 3 MIMO |
| Low | Low | High | 1 × 1 SISO |

Figure 3A:
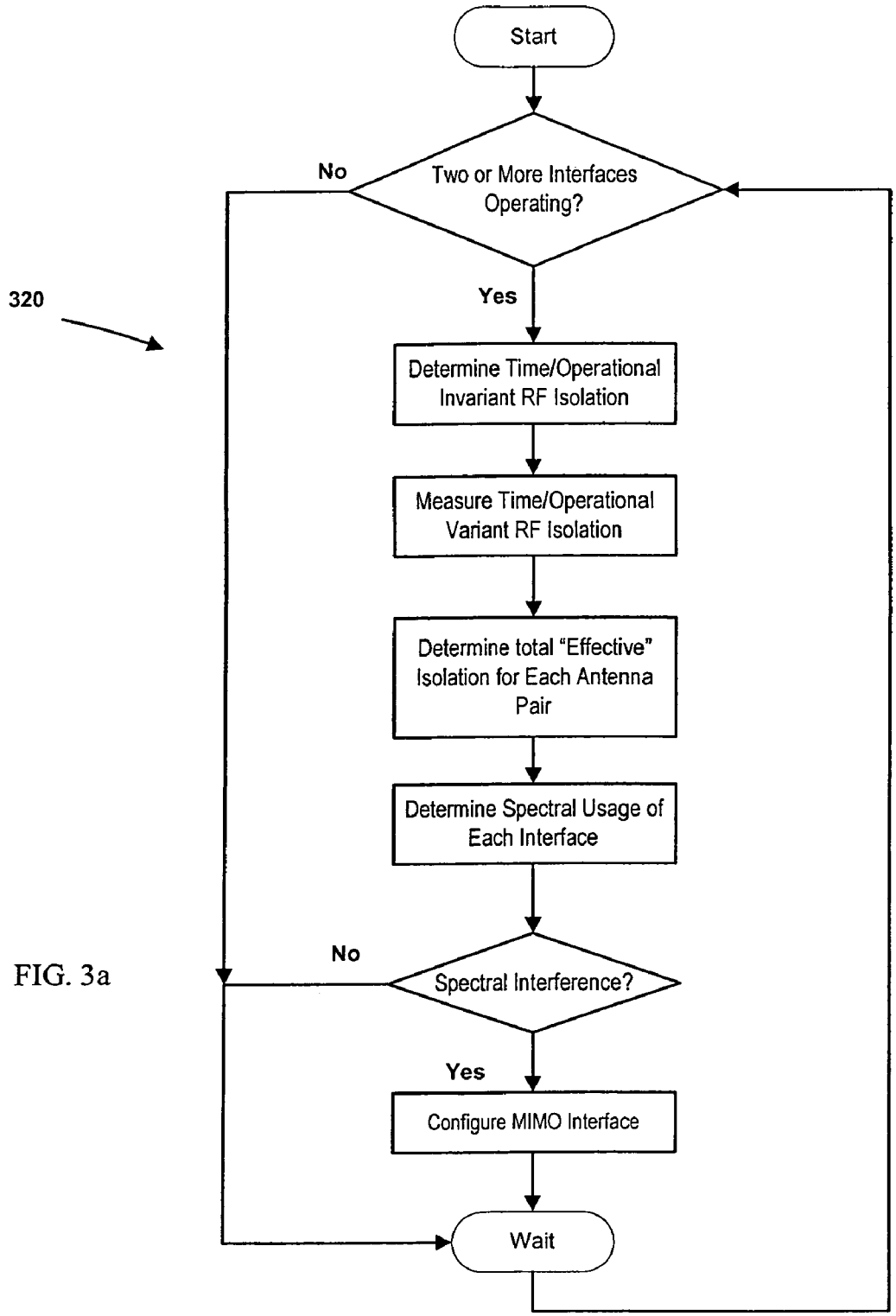
FIG. 3a is a logical flowchart illustrating one alternate embodiment of the methodology of FIG. 3.

In the context of the exemplary WLAN and Bluetooth device configuration, once the WLAN interface receives commands from the Bluetooth interface indicating its activity (either by software or hardware), then the WLAN interface will control its input/output RF chain by commands, such as for example:

Power chain 1 on, chain 2 on:
apple80211-power=on,on
Power chain 1 off, chain 2 on:
apple80211-power=off,on FIG. 3a provided herein illustrates one alternate embodiment 320 of the methodology of FIG. 3, based on various optional determinations and measurements previously described herein with respect to FIG. 3.

Note that an additional operational advantage of the method proposed in the present invention is that the wireless device 200 can reduce power consumption (and hence lengthen battery charge life on mobile devices, which is a critical attribute in many cases) by turning off one of the antenna and the corresponding signal processing circuitry, such as within the aforementioned WLAN MIMO configuration. This also helps mitigate communications collisions between the interfaces. For example, in the exemplary case of a WiFi (WLAN) and Bluetooth coexistence scheme, it is estimated that such switching can save on the order of 20-30% or more of power consumption. In theory, such a feature could save almost half (50%) of WLAN peak power, based on a typical WLAN interface consuming about 2 W at peak power, and switching to a consumption of 1 W-1.5 W. This level of power savings is quite significant, especially for small devices where power storage capability (e.g., battery size) is limited.

The power savings thus achieved can be even more significant in some aspects; i.e., other than merely benefits in terms of reduced power consumption. For example, if an antenna is not turned off, the wireless device 200 might sense higher interference on the WLAN communication channel. In some implementations, this may result in the physical layer transmission rate being dropped to a lower value, which can produce a longer transmission time for transmission of a packet or given amount of data. This in turn may, in some situations, make the transmission more vulnerable to corruption, thereby resulting in further drop in the physical layer transmission rate (especially if retransmissions are imposed). The present invention avoids this "death spiral" phenomenon by turning off one or more antennae, thereby keeping the physical layer transmission rate from experiencing such an accelerated degradation mechanism.

It will also be recognized that the methods and apparatus described herein may be used consistent with the methods and apparatus described in co-owned and co-pending U.S. patent application Ser. No. 12/006,992 filed Jan. 7, 2008 and entitled "Methods and Apparatus for Wireless Device Coexistence" and Ser. No. 12/082,586 filed Apr. 11, 2008 entitled "Methods And Apparatus For Network Capacity Enhancement For Wireless Device Coexistence", each of the foregoing incorporated herein by reference in its entirety, depending on the type of platform and the desired attributes. For example, in one embodiment, the MIMO/SISO switching described herein can be used in a complementary fashion to the WLAN/Bluetooth control mechanisms specified in application Ser. No. 12/082,586 referenced above so as to avoid adverse impacts on WLAN data rate from two possible sources (e.g., (i) competing Bluetooth "loading" of the ISM spectrum due to use of wireless headset, keyboard, mouse, etc., and (ii) interference due to operation in MIMO mode under asymmetric isolation conditions). Other combinations of complementary functionality using the foregoing techniques will also be appreciated by those of ordinary skill given the present disclosure.

Example: Bluetooth and 802.11b/g/n WLAN Coexistence—

Consider a wireless device 200 that has been configured with a Bluetooth interface and a WLAN interface, both using the well-known ISM frequency band. Further assume that in this exemplary embodiment, one antenna is used for Bluetooth transmission/reception, and 2×2 MIMO configuration is used for the WLAN air interface. Because it is a 2×2 system, the WLAN interface utilizes two transmitting antennae and two receiving antennae.

Figure 4:
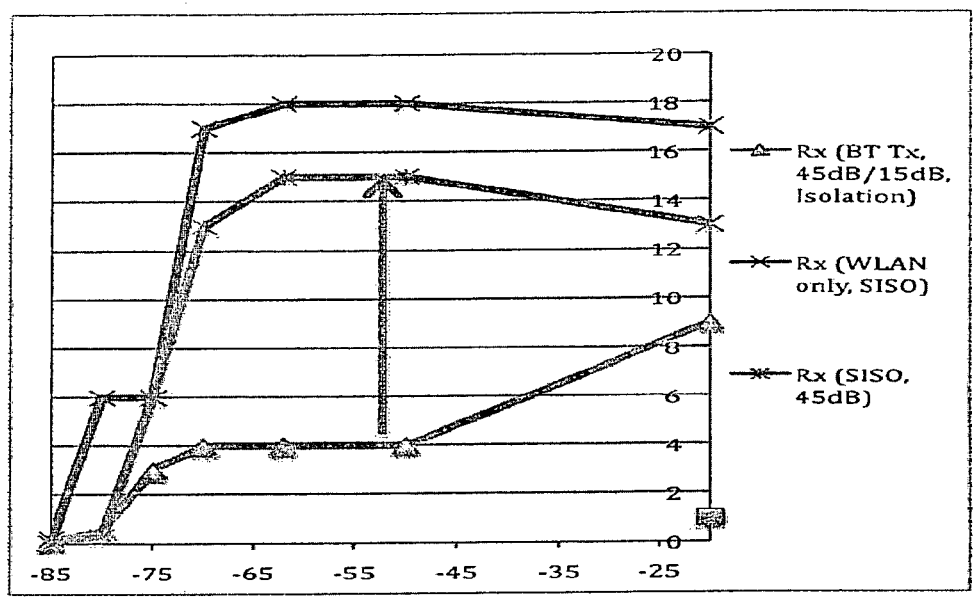
FIG. 4 is an X-Y plot showing bitrates achieved in an exemplary single-in, single-out (SISO) receive operation of a wireless device with multiple air interfaces as compared to multiple antenna (MIMO) operation for the same device.

FIG. 4 shows exemplary (simulated) receiver performance of the WLAN air interface of the above-described device 200 in the presence of Bluetooth transmissions. In this example, one WLAN antenna has about 45 dB isolation from the Bluetooth antenna, and the other WLAN antenna has about 15 dB isolation from the Bluetooth antenna. For these simulations, the Bluetooth transmitter is transmitting at a power level of 4 dBm, and at data rate of 130 Kilobytes per second (it is noted that yet higher rates may also be achievable, and the aforementioned rate is merely for purposes of illustration). The uppermost curve 402 of FIG. 4 shows the receiver performance of the WLAN air interface as a function of transmit power (X-axis or abscissa of FIG. 4) when the Bluetooth transmission is completely turned off; that is, there is no interference between the Bluetooth and WLAN interfaces. When Bluetooth transmission is turned on, the curve 404 of FIG. 4 shows degradation in data throughput at the WLAN interface as a function of transmitted power, assuming that the WLAN interface continues operating in a MIMO configuration.

The curve 406 of FIG. 4 shows that data throughput can be improved by operating the WLAN interface in SISO mode; i.e., by turning off the antenna with the lower isolation with the Bluetooth interface, and operating only with the antenna with higher isolation.

Figure 5:
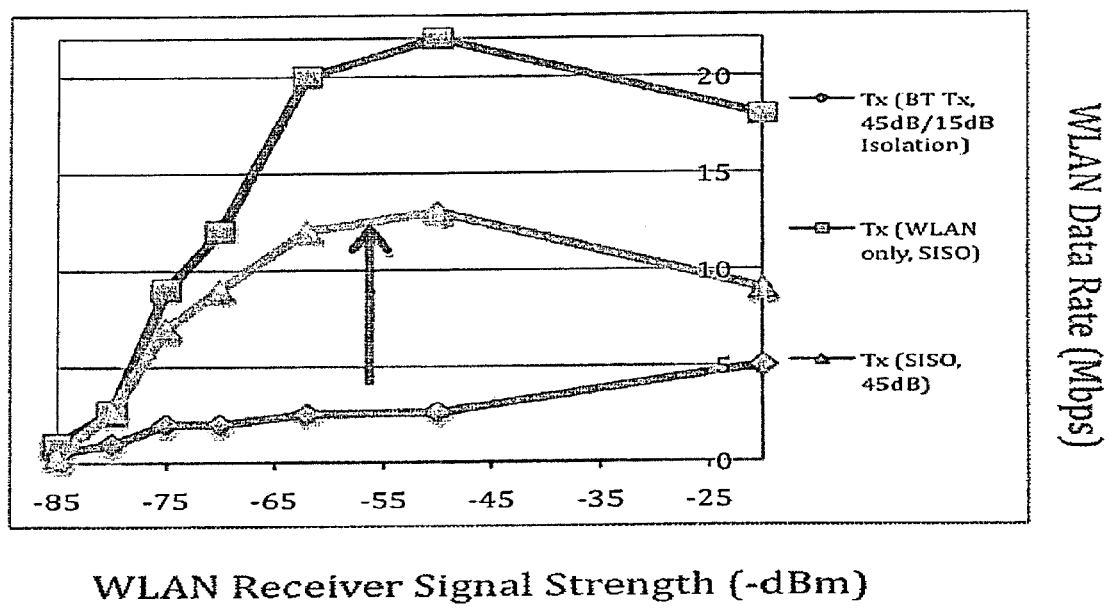
FIG. 5 is an X-Y plot showing bitrates achieved in an exemplary single-in, single-out (SISO) transmit operation of a wireless device with multiple air interfaces as compared to multiple antenna (MIMO) operation for the same device.

FIG. 5 shows exemplary transmission performance of the WLAN air interface of the device 200 in the presence of Bluetooth transmissions. In this example, one WLAN antenna has about 45 dB isolation from the Bluetooth antenna, and the other WLAN antenna has about 15 dB isolation from the Bluetooth antenna. The uppermost curve 502 of FIG. 5 shows transmitter performance of the WLAN air interface as a function of the transmit power (X-axis or abscissa) if the Bluetooth transmission is completely turned off (that is, there is no interference between the Bluetooth air interface and the WLAN interface). When Bluetooth transmission is turned on and transmitting at power level 4 dBm and at data rate 130 Kilobytes per second (again, higher rates may also be achievable, and the aforementioned rate is merely for purposes of illustration), the curve 504 of FIG. 5 shows degradation in data throughput at the WLAN interface, as a function of transmitted power, assuming that the WLAN interface continues operating in MIMO configuration. The curve 506 of FIG. 5 shows that throughput can be improved by operating the WLAN interface in SISO mode, by turning off the antenna having the lower isolation with the Bluetooth antenna, and operating only with the antenna with the higher isolation.

The above simulation model results show that under certain situations, when a MIMO air interface is experiencing interference from another antenna, it is preferable to shut down the antenna at which interference is stronger because of relatively poor isolation from the interfering source. If the interfering signal is of sufficiently high power as measured at the relevant antenna (as might be the case when isolation is poor), it may saturate the signal level at the receiving antenna, causing the receiving antenna to attenuate incoming signals. This may result in desirable signals being attenuated as well.

Furthermore, high power levels of interfering signal due to poor isolation could also result in damage to the front end of the radio receiver. In such a case, even if another antenna in the MIMO system has good isolation with the interfering source, its operation may have to be compromised. In such cases, it might be preferable to completely turn off the antenna with poor isolation, and operate the MIMO air interface with one less antenna. For example, a 2×2 MIMO system may be scaled back to operate in 1×1 (SISO) mode, a 3×3 antenna system may be scaled back to operate in 2×2 mode, and so forth.

Wireless Apparatus—

Figure 6:
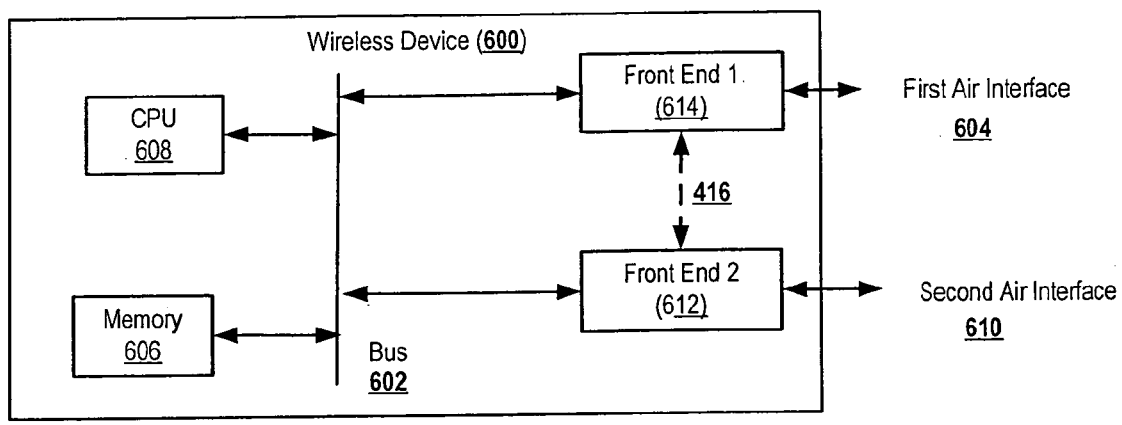
FIG. 6 is a block diagram showing the functional relationships of components within an exemplary wireless device implemented in accordance with one embodiment of the present invention.

FIG. 6 shows a block diagram of an exemplary implementation of a wireless device 200 of the type previously described herein, wherein the methods of the invention are implemented. As shown in FIG. 6, a signal bus 602 communicatively connects a central processor unit (CPU) 608, a memory unit 606 and two RF "front-ends" (Front-End 1 (614) and Front-End 2 (612)) to each other, each of the foregoing rendered in the form of integrated circuits disposed on a substrate such as an FR-4 circuit board or the like. Front-end 1 614 is communicatively connected to a first air interface 604 and Front-End 2 612 is communicatively connected to a second air interface 610. A signal 616 between the two front-ends 612, 614 may be used to communicate the activity signal. In some embodiments, this signal 616 may not be present in hardware, but may be implemented in software as previously described herein.

The wireless device 200 of FIG. 6 may comprise for example a mobile telephone or smartphone, laptop computer, PDA or other hand-held device, or in fact any device having multiple air interfaces with the potential for interference. For instance, even residential or enterprise base stations may utilize the technology described herein for management of interference among its multiple air interfaces if so equipped. The present invention is accordingly no way limited to a particular application (communications versus data), location or use (mobile versus fixed), or function (transmitter versus receiver).

Test Results—

Figure 7:
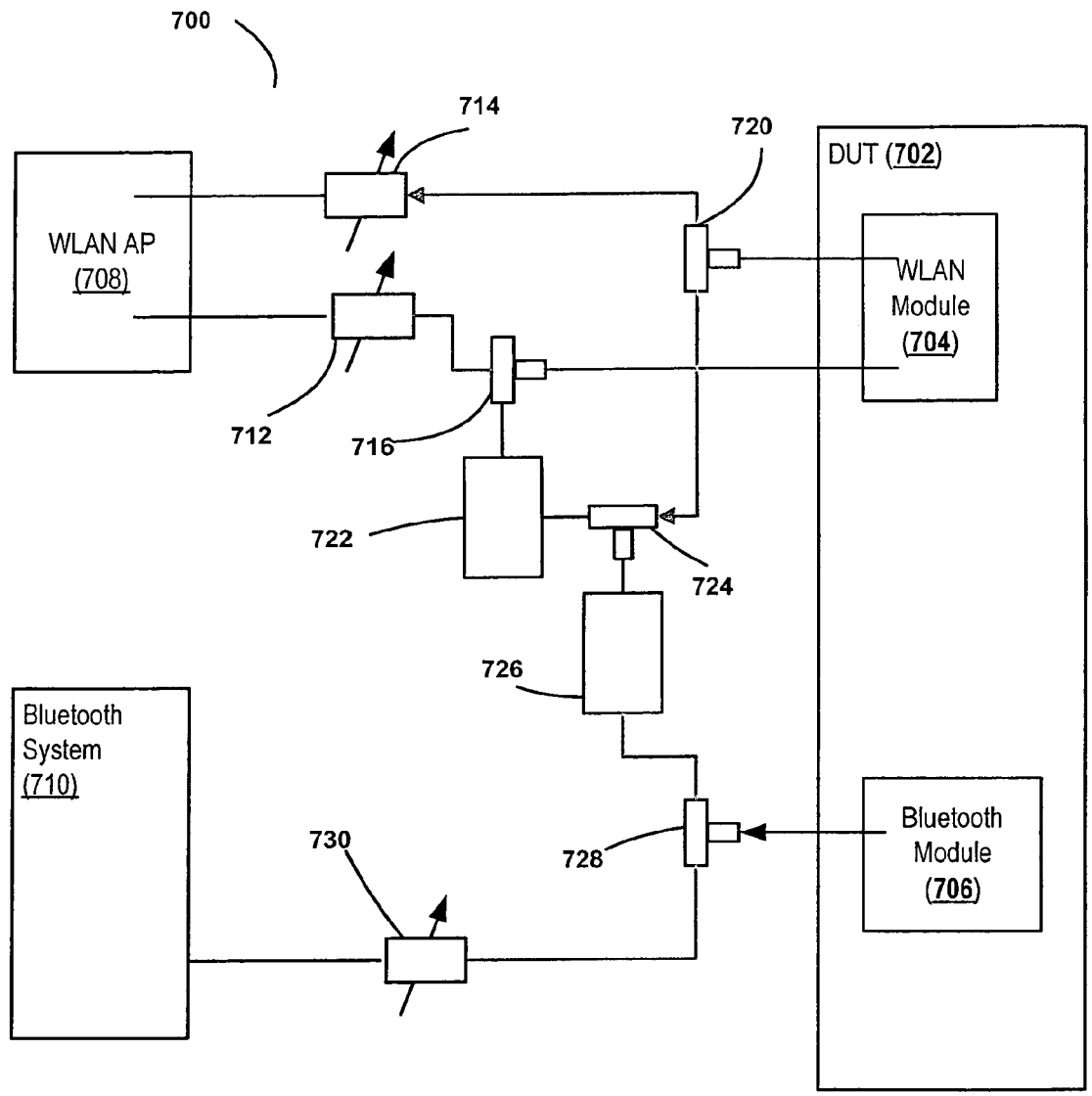
FIG. 7 is a block diagram showing an exemplary test setup useful with, inter alia, the present invention.

FIG. 7 shows an exemplary configuration of a test setup 700 useful in accordance with the invention. Specifically the setup 700 of FIG. 7 might be used where testing and adaptation to the configuration of a particular device are required. For example, the test setup may be used to generate graphs of the type shown in FIGS. 4 and 5. A wireless device under test (DUT) 702 includes two or more air interfaces (e.g., a WLAN module 704 and a Bluetooth module 706). The WLAN module 704 communicates with a WLAN access point (AP) 708. One antenna is simulated by connecting one terminal on the WLAN module 704 to the WLAN AP 708 through an attenuator 714 and a splitter 720. The other antenna of the WLAN module 704 is simulated by connecting the second terminal of the WLAN module 704 to the second terminal of WLAN AP 708 through splitters 760 and 720 and variable attenuator 712. The attenuators 714 and 712 simulate the RF signal path loss in the WLAN network. The Bluetooth module 706 is connected to the Bluetooth system 710 through the splitter 728 and a variable attenuator 730. The Bluetooth module 706 also causes interference to the first terminal of WLAN module 704 through its connection via splitter 728, variable attenuator 726, and splitters 724 and 720. The Bluetooth module 706 causes interference at the second terminal of WLAN module 704 through the splitters 728, 724 and 716 and variable attenuators 726 and 722. If all splitters are assumed to have about the same signal attenuation, then the variable attenuator 722 represents the additional isolation between simulated antenna of the Bluetooth module 706 and simulated antennae of the WLAN module 704. Various performance curves, such as ones shown in FIGS. 4 and 5, can conveniently be generated and evaluated using this test setup.

Methods of Doing Business—

In another aspect of the invention, methods of doing business relating to the aforementioned apparatus and methods are disclosed.

Figure 8:
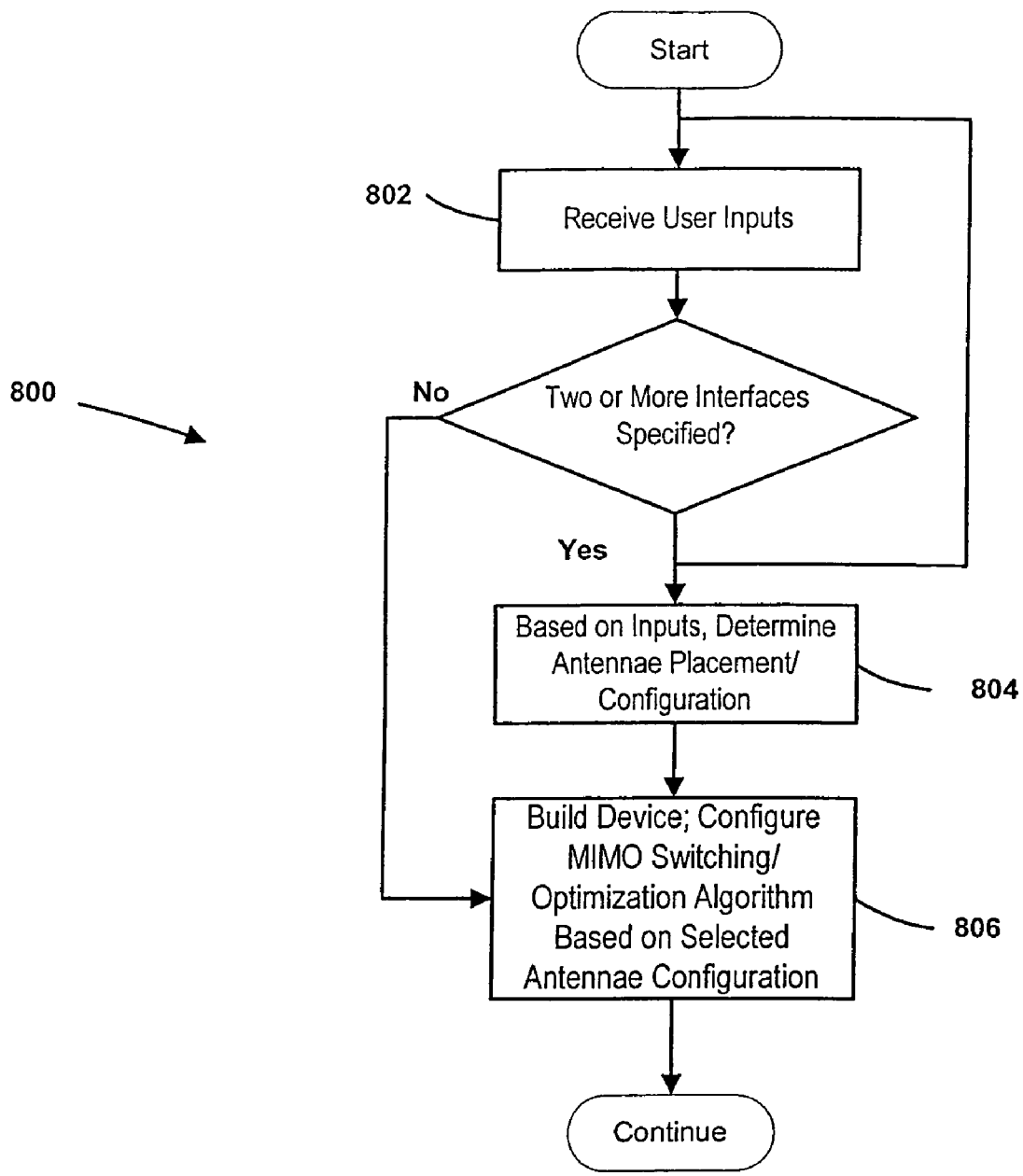
FIG. 8 is a logical flow diagram illustrating one embodiment of a business methodology relating to the MIMO/SISO switching and optimization techniques of the invention.

In one embodiment (see FIG. 8), the method 800 comprises providing (e.g., selling for valuable consideration) portable computers such as laptops, PDAs, smartphones, or other client devices or services (e.g., the Apple MacBook Air™ laptop computer, or Apple TV™ set-top box and service, provided by the Assignee hereof) that include the MIMO/SISO switching and optimization features discussed previously herein. Specifically, as shown in FIG. 8, the client device configuration is first determined per step 802, including selection of various options by a consumer. This may be accomplished for example via the Internet (e.g., using an on-line configuration interface or "wizard" or routine) which allows the customer to configure their prospective device according to any number of different options ("builds"). For instance, one user may want a Bluetooth and WiFi (802.11n) build in a very space-constrained device, such as the Macbook Air computer manufactured by the Assignee hereof.

At step 804, based on the user's inputs as step 802, the device is configured, including selecting from two or more different antenna placement locations. In space-constrained applications such as the aforementioned Macbook Air device, these location choices may be limited. These choices may be further restricted by other factors, such as the use of a metallic casing (housing) on the device. For instance, in a device having an almost entirely metallic housing such as the Macbook Air, the available choices for both Bluetooth and WLAN (MIMO) antenna placement are quite limited, including locations on or proximate to the hinge assembly between the "clamshell" portions of the housing. So, for example, where the user requests a WLAN interface only, the two (or more) MIMO antennae of the WLAN interface could be disposed anywhere along that hinge assembly (other restrictions permitting), since no interference with another indigenous interface would occur. However, when a Bluetooth or other such interface is added to the build, the asymmetric isolation previously described must be considered, and hence locations for the two (or more) WLAN MIMO antennae and the Bluetooth antenna would need to be coordinated so as to maintain adequate WLAN/BT isolation for at least one of the WLAN MIMO antennae. If a 3×3 MIMO arrangement were used, yet another placement pattern would be mandated, as would be the case if a third air interface (e.g., WiMAX or UWB) were added as well.

At step 806, the device is built according to the user's selected configuration and the antenna placement requirements of step 804. Moreover, as part of step 806, the device hardware/software may be configured (e.g., programmed) with the isolation data relating to the selected antenna configuration. For instance, if a certain WLAN MIMO and BT antennae element placement were mandated by the MIMO/SISO switching and optimization requirements, then test values obtained from a prototype device so configured (e.g., obtained using the test rig of FIG. 7) could be loaded into memory, EEPROM, etc. so that the switching/optimization algorithm (see FIGS. 3 and 3a) would know what the isolation was between various of the antennae for different operating conditions. This approach advantageously obviates the need to discover or measure the actual isolation of the device being built (i.e., the prototype is presumed to accurately reflect the condition of all subsequently manufactured production devices), but does have the drawback that the latter approach can dynamically detect any configuration changes (such as the addition of a WiMAX card or other potentially interfering device) after manufacture, and ostensibly adapt the operation of the MIMO/SISO switching algorithm accordingly.

In another aspect of the business method, consumers may bring back their already purchased client devices (e.g., laptops, smartphones, PDAs, etc.) for or after reconfiguration so as to have them "re-optimized" for the new configuration. This may include relocating one or more of their MIMO antennae so as to provide the aforementioned asymmetry in isolation.

Alternatively, the user's device may be configured with its own indigenous evaluation/optimization capability as previously described above. For example, a laptop user might install a WiFi (802.11n) card themselves if their production device was not so equipped. With the new card, there may be significant interference with another existing or co-installed air interface, hence requiring MIMO/SISO switching/optimization according to the methods described herein.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Apparatus having multiple air interfaces, comprising:
a plurality of first antenna elements configured to communicate on a first air interface;
at least one second antenna element configured to communicate on a second air interface;
first front end circuitry operatively coupled with said plurality of first antenna elements, said first front end circuitry enabling transmitting and receiving signals over said first air interface;
second front end circuitry operatively coupled with said at least one second antenna element, said second front end circuitry enabling transmitting and receiving signals over said second air interface;
a communication channel between said first air interface and said second air interface and adapted to carry activity information; and
a processor communicatively coupled to said first front end circuitry and said second front end circuitry; said processor configured to:
determine an isolation between antennae pairs formed from said plurality of first antenna elements and said at least one second antenna element;
evaluate whether said isolations are symmetric or asymmetric; and
based at least in part on said evaluation, not using of at least one antenna element from said plurality of first antennae.

2. The apparatus of claim 1, wherein said first front end circuitry comprises front end circuits for each of said antenna elements of said plurality, and said not using comprises turning off at least a portion of said front end circuits.

3. The apparatus of claim 1, wherein said not using comprises not using if said isolations are evaluated to be asymmetric.

4. The apparatus of claim 1, wherein said apparatus comprises a portable computerized device having a substantially metallic outer case.

5. The apparatus of claim 1, wherein said first air interface comprises a wireless local area network (WLAN) interface having multiple-input multiple-output (MIMO) capability, and said second air interface comprises a personal area network (PAN) interface.

6. The apparatus of claim 5, wherein the placement of said plurality of first antenna elements of said WLAN interface and said at last one second antenna element of said PAN interface within said apparatus does not permit isolation levels between said plurality of first elements and said at least one second element sufficient for simultaneous operation of all of said plurality of first elements and said at least one second element without significant degradation of a data rate of said WLAN interface.

7. The apparatus of claim 1, wherein said processor is configured to detect said isolations as a function of at least one of:
  (i) the physical placement of said plurality of first antenna elements;
  (ii) an operational setting of said first front end circuitry; and
  (iii) an operational setting of said second front end circuitry.

8. The apparatus of claim 1, wherein said communication channel comprises one or more hardware-based channels adapted to carry signals from said second air interface to said first air interface.

9. Wireless portable apparatus adapted for data communication over first and second air interfaces, the apparatus comprising:
  a first air interface having at least two antennae associated therewith;
  a second air interface having at least one antenna associated therewith, said first and second air interfaces operating in a substantially overlapping frequency band, said at least two antenna of said first air interface being disposed within said apparatus asymmetrically with respect to their isolations with said at least one antenna of said second air interface;
  a processor; and
  a storage device, said storage device comprising a computer program having a plurality of instructions that when executed:
    determine if a potential for interference between said first and second air interfaces exists; and
    if said potential exists, turning at least one of said at least two antennae off so as to mitigate said interference.

10. The apparatus of claim 9, wherein:
  said first air interface comprises a multiple-input multiple-output MIMO wireless LAN (WLAN) interface;
  said second air interface comprises a personal area networking (PAN) interface; and
  said turning at least one of said at least two antenna off comprises disabling transmission or reception via one of said at least two antennae that has lower isolation with said at least one antenna of said PAN interface.

11. The apparatus of claim 10, wherein said apparatus comprises a portable computerized device having a clamshell-like outer case, and said at least two antennae of said WLAN interface and said at least one antenna of said second air interface are all disposed substantially within a hinge region of said clamshell-like case.

12. The apparatus of claim 11, wherein said outer case is substantially metallic.

13. The apparatus of claim 9, wherein said determination of the potential for interference comprises determining whether both first and second air interfaces are transmitting or receiving at the same time.

14. A method of operating a device having at least first and second air interfaces, the method comprising:
  communicating on the first air interface via a plurality of first antenna elements;
  communicating on the second air interface via at least one second antenna element; and
  wherein the first and second air interfaces are additionally coordinating activity information via a distinct communication channel;
  determining isolations between antennae pairs formed from the plurality of first antenna elements and the at least one second antenna element;
  evaluating whether the isolations are symmetric or asymmetric; and
  based at least in part on the evaluation, enabling a subset of the plurality of first antenna elements.

15. The method of claim 14, wherein the first air interface comprises a multiple-input multiple-output MIMO wireless LAN (WLAN) interface, and the second air interface comprises a personal area networking (PAN) interface.

16. The method of claim 15, wherein the device comprises a mobile wireless device also having a cellular air interface and an at least partly metallic outer housing.

17. Wireless portable apparatus adapted for data communication over first and second air interfaces, the apparatus comprising:
  a first air interface having at least two antennae associated therewith;
  a second air interface having at least one antenna associated therewith, the first and second air interfaces operating in a substantially overlapping frequency band, the at least two antenna of the first air interface being disposed within the apparatus asymmetrically with respect to their isolations with the at least one antenna of the second air interface;
  a processor; and
  a storage device in data communication with the processor, the storage device comprising a computer program having a plurality of instructions that are configured to, when executed on the processor:
    determine when a potential for interference between the first and second air interfaces exists; and
    when the potential exists, turning at least one of the at least two antennae off so as to mitigate the interference.

18. The apparatus of claim 17, wherein:
  the first air interface comprises a multiple-input multiple-output MIMO wireless LAN (WLAN) interface;
  the second air interface comprises a personal area networking (PAN) interface; and
  the turning at least one of the at least two antenna off comprises disabling transmission or reception via one of the at least two antennae that has lower isolation with the at least one antenna of the PAN interface.

* * * * *